United States Patent

[11] 3,617,936

[72] Inventor John E. Bjorkholm
 Middletown, N.J.
[21] Appl. No. 827,708
[22] Filed May 26, 1969
[45] Patented Nov. 2, 1971
[73] Assignee Bell Telephone Laboratories, Incorporated
 Murray Hill, N.J.

[54] FREQUENCY CONTROL OF A PULSED PARAMETRIC OSCILLATOR BY RADIATION INJECTION
6 Claims, 1 Drawing Fig.

[52] U.S. Cl.................................................. 331/175,
 307/883, 330/4.5, 331/107
[51] Int. Cl.................................................... H03f 7/00
[50] Field of Search........................................... 307/88.3;
 330/4.5; 331/107, 175

[56] References Cited
UNITED STATES PATENTS
3,426,286 2/1969 Miller.......................... 330/4.5

Primary Examiner—Roy Lake
Assistant Examiner—Darwin R. Hostetter
Attorneys—R. J. Guenther and Arthur J. Torsiglieri ABSTRACT: A singly resonant optical parametric oscillator (SRO) is pumped by a high power, pulsed source and is tuned approximately to a predetermined desired frequency. Radiation of that frequency is injected into a mode of the SRO from a stabilized, low-power injection source. The output of the SRO is a pulsed, high-power signal with frequency equal to the predetermined frequency to a high degree of accuracy.

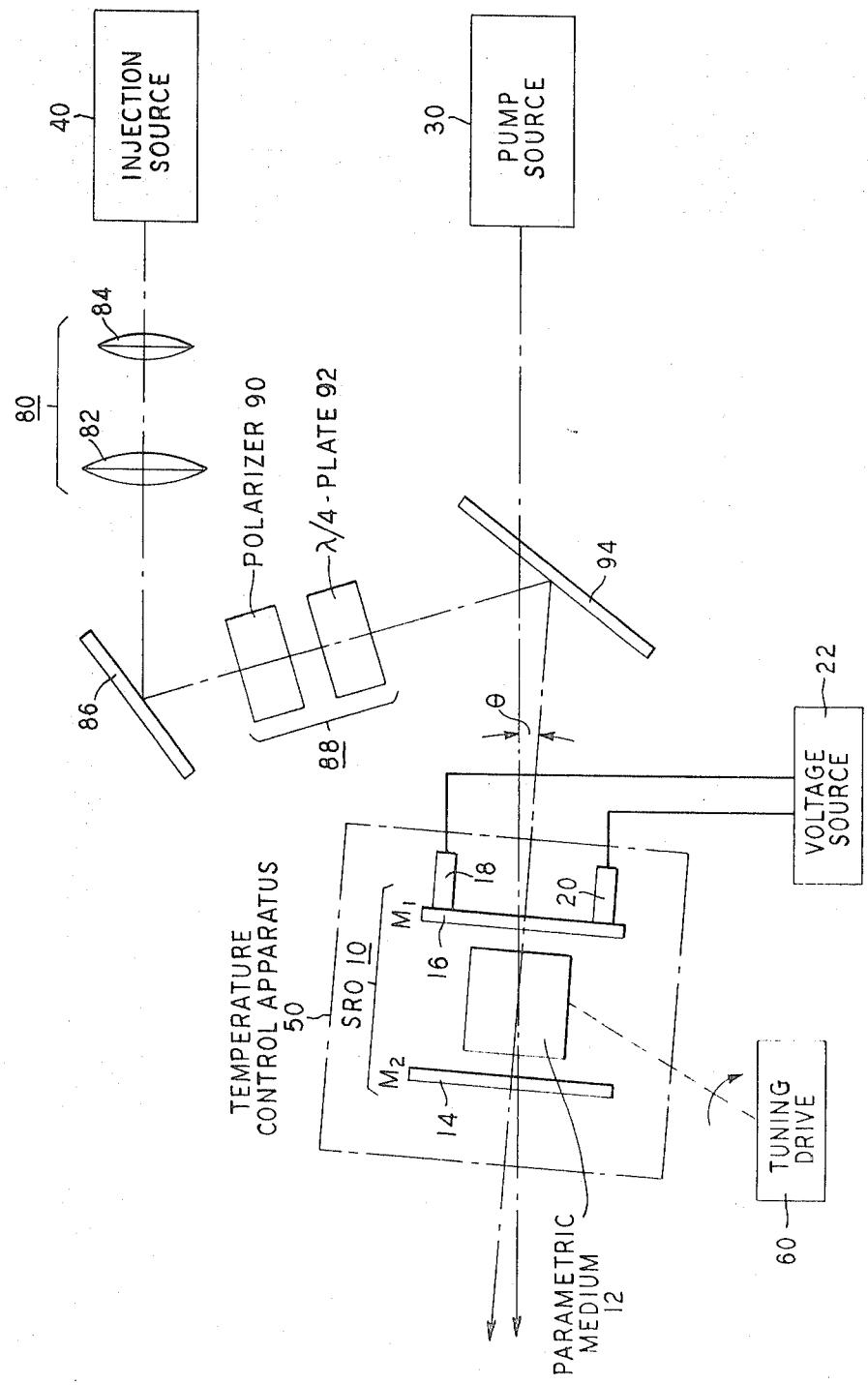

FREQUENCY CONTROL OF A PULSED PARAMETRIC OSCILLATOR BY RADIATION INJECTION

BACKGROUND OF THE INVENTION

This invention relates to optical parametric oscillators and, more particularly, to the frequency control of pulsed optical parametric oscillators by radiation injection.

In the pioneer experiments performed with optical parametric oscillators, primary emphasis was placed upon achieving oscillation threshold; in fact, this continues to be a major problem when using continuous wave (cw) pump sources. With the use of pulsed pump sources, however, highly efficient operation of pulsed parametric oscillators has recently been demonstrated. Efficient operation having been achieved, one of the next most important goals to achieve is spectral control and spectral purity in these devices.

The spectral properties of highly efficient pulsed optical parametric oscillators has been reported by applicant in *Applied Physics Letters*, 13, 399 (1968). It was found that the spectral properties of a singly resonant oscillator (SRO) were far superior to those of a doubly resonant oscillator (DRO). But even for an SRO it was found that the output spectra were not usually single axial mode nor exactly reproducible from shot-to-shot, which arises from the fact that the gain curve (versus frequency) of a strongly pumped oscillator is very broad and the gain is very high. In addition, the problem of spectral control is compounded because the frequency of a pulsed pump source may drift during the pump pulse interval and furthermore is not reproducible form shot-to-shot.

It is therefore the object of the present invention to achieve pulsed, high-power efficient operation in an optical parametric oscillator and at the same time achieve spectral purity and spectral control. The uses of such a device include inducing chemical reactions by frequency selective molecular excitation and exciting narrow-band optical elements or switches such as those utilizing materials which exhibit self-induced transparency and require frequency selective excitation.

SUMMARY OF THE INVENTION

In accordance with an illustrative embodiment of the present invention, pulsed high-power, spectrally pure and controllable operation is efficiently achieved in a singly resonant optical parametric oscillator which is pumped by a conventional high-power, pulsed laser and into a mode of which is injected low-power of which is radiation from another source e.g., a stabilized cw laser. With the SRO tuned approximately to the frequency of the injected radiation, its output is a high-power pulse at the injected frequency to a high degree of accuracy.

The SRO utilized in the present invention is made to be resonant at either its signal or idler frequencies, but not both, by designing at least one of the resonator reflectors to be substantially totally transmissive to the nonresonant radiation. Both resonator reflectors are, of course, highly reflective to the resonant radiation. The SRO is discussed in applicant's article in *Applied Physics Letters*, 13, 53 (1968) and is the subject matter of applicant's copending application Ser. No. 808,767 (particularly pages 12-14) filed on Mar. 20, 1969 and assigned to the assignee of the present application.

BRIEF DESCRIPTION OF THE DRAWINGS

The invention, together with its objects, features and advantages, can be easily understood from the following more detailed description taken in conjunction with the accompanying FIGURE which is a schematic of an illustrative embodiment of the invention.

DETAILED DESCRIPTION

Turning now to the FIGURE, there is shown optical apparatus for the frequency control of a pulsed parametric oscillator by radiation injection. The apparatus comprises a singly resonant parametric oscillator 10 which is pumped by radiation from pump source 30, e.g., a single mode pulsed laser. The SRO 10 comprises a parametric medium 12 (i.e., a medium in which optical parametric oscillations can be established) disposed in a plane parallel resonator formed by planar reflectors 14 and 16. The SRO is singly resonant in that either the signal or idler frequencies, but not both, generated in the medium 12 is resonated. Thus, if it is desired to resonate only the signal frequency, then both mirrors 14 and 16 are highly reflective to that frequency, whereas at least one of the mirrors, typically mirror 14, is made substantially totally transmissive at the nonresonant idler frequency. The tuning of the cavity resonator is typically accomplished by means of piezoelectric mounts 18 and 20 secured to mirror 16 and electrically coupled to a fine turning voltage source 22. In addition, the parametric medium itself may be tuned in several ways. For example, the medium 12 may be physically rotated by means of tuning drive 60 or the temperature of the medium may be varied by temperature control apparatus 50. These and other methods of tuning parametric oscillators are disclosed in the following U.S. Pat. No. 3,234,474; No. 3,309,526; No. 3,201,709; No. 3,262,058; and No. 3,328,723.

Using any one of the aforementioned tuning techniques, or any combination thereof, the peak of the gain curve of the SRO is tuned approximately to a predetermined desired output frequency. Radiation at the desired frequency is injected into the SRO from an injection source 40, which is illustratively a stabilized, low-power, single mode, cw laser. While source 40 is described herein as being cw, it could readily be a pulsed source in which case its pulsed output would be timed by means well known in the art to be injected into the SRO 10 slightly before pump source 30 is turned on. In any event, some portion of the pump pulse and the injected pulse should overlap with each other. In the present embodiment the output of injection source 40 is transmitted through a telescope system 80 formed by a pair of coaxial lenses 82 and 84, and is then reflected from mirror 86 through an isolator 88 formed by the tandem combination of polarizer 90 and quarter-wave plate 92. The beam diameter of the laser 40 having been adjusted by telescope 80 to match the beam diameter of pump source 30, the injected radiation is then reflected from a bean splitter 94 into the SRO 10. As shown in the FIGURE, the beam paths of the sources 30 and 40 are not collinear, but rather are at an angle $\theta$ (typically 6 minutes) to one another in order that spurious pump radiation reflected from mirror 16 not be retransmitted into pump source 30. The function of the angle $\theta$, therefore, is to provide isolation from the pump source 30. It is possible, of course, to utilize collinear interaction in the SRO and to provide isolation by means of a separate isolator element (such as 88) positioned between mirror 16 and pump source 30 by techniques well known in the art. In addition, it is also possible to position beam splitter 94 within the SRO resonator instead of external thereto as shown in the FIGURE.

This apparatus permits the accurate control of the frequency of the resonated signal in the pulsed high-power SRO by the injection of frequency controlled radiation from the low-powered source 40 into a mode of the SRO cavity. The output of the SRO is a high-power pulse with frequency equal to the predetermined injected frequency to a high degree of accuracy. As mentioned previously, several deficiencies of the pulsed pump source 30 (e.g., a ruby laser) render it extremely difficult to achieve stable high-power operation in prior art parametric oscillators; that is, the frequency of the pump radiation often drifts during the pulse interval and moreover is not reproducible from pulse to pulse. In addition, spectral purity is difficult to achieve because of the broadband high gain characteristic of the parametric medium which tends to sustain oscillation at more than one frequency. Consequently, the frequency output of prior art pulsed parametric oscillators suffers greatly from lack of frequency control. In the present invention, however, the use of a singly resonant parametric oscillator significantly alleviates these problems. Thus, notwithstanding drifts in pump frequency, the resonant signal of the SRO remains locked to the injected frequency of the source 40. Any drift in pump frequency is compensated for by the nonresonant idler which, because it is nonresonant, is free to change its frequency so that the condition for parametric oscillation $\omega p = \omega s + \omega i$ always remains satisfied, where the $\omega$ is angular frequency and the subscripts $p$, $s$, and $i$ represent the pump, signal, and idler, respectively.

It should be noted here that the frequency locking described occurs effectively for only a limited period of time, for example, several tens of nanoseconds. Although this limited period appears to be short, it is more than sufficient for the applications herein described. The existence of this time limitation can be explained by assuming that the radiation is usually injected into the mode of the SRO cavity having a momentum mismatch ($\Delta k \neq 0$). When the pump 30 is turned on, the radiation in this mode starts to grow exponentially, but grows less rapidly than the mode nearest $\Delta k = 0$. Nonetheless, if the initial level of the injected mode is sufficiently large (about $1^1$W) compared with the noise level (about $10^{-110}$ watts), the injected mode starts to deplete the pump before the mode nearest $\Delta k = 0$ does. If the injected mode is considerably more intense than the mode nearest $\Delta k = 0$ at this time, the SRO settles into quasi-steady state oscillation at the injected mode, and the gain seen by the mode nearest $\Delta k = 0$ is greatly reduced due to pump depletion. However, this mode still experiences net positive gain and continues to build up, although slowly, even in the presence of quasi-steady state oscillation on the injected mode. Hence, after a period of time the mode nearest $\Delta k = 0$) begins to challenge the injected mode for the pump power and an interaction takes place in which the mode nearest $\Delta k = 0$ takes over and the injected mode dies out. Thus, the frequency control lasts for only a limited period of time.

For convenience and efficiency of operation, the pump source 30 is preferably adapted by techniques well known in the art to oscillate in a single transverse mode, although it may operate in multilongitudinal modes. On the other hand, the injection source 40 is preferably adapted to oscillate in both a single transverse mode and a single longitudinal mode, with its transverse mode matching the transverse mode (usually the fundamental of the pump source 30. However, it is readily possible to utilize a multilongitudinal mode injection source 40 if, for example, it is adapted such that one-half its doppler linewidth is less than the longitudinal mode spacing of the SRO 10, or if the longitudinal mode spacing of the SRO 10 and source 40 are not an integral multiple of one another. These conditions are readily achieved by appropriate choice of the lengths on the resonators of the SRO 10 (typically about 1 cm.) and the injection source 40 (typically about 50 cm.).

In addition, using the tuning techniques in the aforementioned patents or those disclosed in the copending application Ser. No. 717,654 of J. A. Giordmaine filed on Apr. 1, 1968 and assigned to applicant's assignee, it is possible to make the injection source a low-power parametric oscillator which is continuously and accurately tunable over a broad range of frequencies.

Example

In an illustrative example, the frequency of the short wavelength, resonated output of a LiNbO$_3$ SRO, pumped by a single-mode ruby laser at 6,943 A, has been frequency locked to a stabilized single mode, cw Nd:YAG laser using radiation injection. Oscillation repeatably takes place on a single axial mode of the SRO cavity the frequency of which as previously described, was adjusted to be approximately equal to that of the injected radiation. The single mode ruby laser is well known in the art and is described in an article by applicant and R. H. Stolen in *Journal of Applied Physics*, 39, 4043, (1968). The orientation of the LinBO$_3$ crystal is adjusted so that without injection the resonated, short wavelength output of the oscillator is in the vicinity of 1.064$\mu$ and the corresponding nonresonant long wavelength output is near 2.00$\mu$. The reflectivities of mirror 16 were 16.0 percent at 0.693$\mu$, and 97.8 percent at 1.064$\mu$ and 8.6 percent at 2.00$\mu$. The corresponding reflectivities of mirror 14 were 12.0 percent, 93.8 percent and 9.0 percent. The cw, single longitudinal and single transverse mode Nd:YAG laser was stabilized (by techniques disclosed by H. G. Danielmeyer in application, Ser. No. 819,887 filed on Apr. 28, 1969 and assigned to applicant's assignee) against frequency drift and intensity fluctuations and its output power was about 15 mW. (Other cw sources such as a He-Ne laser are readily stabilized by techniques well known in the art). For a 3 MW, 15 nanosecond (FWHM) pump pulse, maximum output power was approximately 100 kW in a 5 nanosecond pulse. With radiation injection from a Nd:YAG laser, oscillation in the SRO takes place primarily in the mode corresponding to the injected frequency. The high degree of accuracy achieved by this apparatus is demonstrated by the fact that the frequency of the short wavelength SRO output equals that of the injected Nd:YAG laser radiation to better than 25 MHz, (about one part in 10 million).

For approximately 10 MW of circularly polarized Nd:YAG radiation incident on the SRO and a pump power of approximately 3 MW, locking was also obtained over a range of about 18 A. at 1.064$\mu$, i.e., locking was obtained with the peak of the SRO gain curve tuned to within about 18 A. of the wavelength of the Nd:YAG laser, which is readily accomplished by techniques well known in the art. For the same pump power, and with the SRO tuned to within several angstroms of the Nd:YAG wavelength, the minimum power for which locking occurs is approximately 1$\mu$W of circularly polarized Nd:YAG radiation.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

In particular, it is possible to use in place of the laser injection source an incoherent broadband source in conjunction with a narrow band monochrometer and an appropriate lens system to couple into the spatial mode of the singly resonant oscillator. Other sources of such radiation include amplified parametric noise and the radiation from a spark caused by laser induced breakdown in air.

What is claimed is:

1. Optical apparatus for generating high power optical pulses with a high degree of frequency accuracy comprising
   a singly resonant parametric oscillator tuned approximately to a predetermined frequency,
   a first source of pulsed radiation coupled to said oscillator for exciting said oscillator at its signal and idler frequencies,
   a second source of radiation at said predetermined frequency coupled to said oscillator, the output of said oscillator comprising high power pulsed radiation of frequency equal to said predetermined frequency to a high degree of accuracy.

2. The optical apparatus of claim 1 wherein said parametric oscillator is adapted to be frequency tunable to said predetermined frequency and said second source comprises a tunable source of coherent radiation.

3. The optical apparatus of claim 2 for generating high power optical pulses with an accuracy of about one part in 10 million, wherein
   said first source comprises a pulsed source of high power coherent radiation, and
   said second source comprises a source of continuous-wave, low-power coherent radiation.

4. The optical apparatus of claim 3 wherein
   said first source is adapted to oscillate in its fundamental transverse mode only, and
   said second source is adapted to oscillate in its fundamental longitudinal and transverse modes only, said transverse mode matching the transverse mode of said first source.

5. The optical apparatus of claim 3 wherein said second source is adapted to oscillate in multilongitudinal modes and to have a doppler line width such that one half said line width is less than the longitudinal mode spacing of said singly resonant parametric oscillator.

6. The optical apparatus of claim 3 wherein said second source is adapted to oscillate in multilongitudinal modes having a longitudinal mode spacing which is not an integral multiple of the longitudinal mode spacing of said singly resonant parametric oscillator.

* * * * *

UNITED STATES PATENT OFFICE
CERTIFICATE OF CORRECTION

Patent No. 3,617,936  Dated November 2, 1971

Inventor(s) John E. Bjorkholm

It is certified that error appears in the above-identified patent and that said Letters Patent are hereby corrected as shown below:

Column 1, line 30, after "reproducible" change "form" to --from--.

Column 1, line 47, after "low-power" delete "of which is".

Column 2, line 14, after "fine" delete "turning" and insert --tuning--.

Column 3, line 20, after "(about" delete $1^{1W}$ and insert --1µW--.

Column 3, line 21, after "(about" delete "$10^{110}$" and insert --$10^{-10}$--.

Column 3, line 31, after $\Delta k = 0$ delete the parenthesis.

Column 4, line 11, after "MW" delete the period.

Column 4, line 23, after "A" delete the period.

Column 4, line 24, after "A" delete the period.

Column 4, line 63, after "claim" change "2" to --1--.

Signed and sealed this 9th day of May 1972.

(SEAL)
Attest:

EDWARD M. FLETCHER, JR.
Attesting Officer

ROBERT GOTTSCHALK
Commissioner of Patents